(12) United States Patent
Muthulingam et al.

(10) Patent No.: US 7,249,152 B2
(45) Date of Patent: Jul. 24, 2007

(54) DYNAMIC DISK SPACE MANAGEMENT BY MULTIPLE DATABASE SERVER INSTANCES IN A CLUSTER CONFIGURATION

(75) Inventors: Sujatha Muthulingam, Campbell, CA (US); Alexander Tsukerman, Foster City, CA (US); Vishwanath Karra, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 490 days.

(21) Appl. No.: 10/435,282

(22) Filed: May 8, 2003

(65) Prior Publication Data

US 2003/0220951 A1 Nov. 27, 2003

Related U.S. Application Data

(60) Provisional application No. 60/383,498, filed on May 24, 2002.

(51) Int. Cl.
*G06F 12/00* (2006.01)
(52) U.S. Cl. ........................................ 707/205; 711/209
(58) Field of Classification Search ................ 707/101, 707/202, 205; 711/112, 203
See application file for complete search history.

(56) References Cited

U.S. PATENT DOCUMENTS 5,463,776 A * 10/1995 Voigt et al. .................. 707/101

| | | | | |
|---|---|---|---|---|
| 5,713,002 A | * | 1/1998 | Zbikowski et al. | 711/112 |
| 6,233,666 B1 | * | 5/2001 | Mathews et al. | 711/203 |
| 6,606,658 B1 | * | 8/2003 | Uematsu | 709/225 |
| 6,732,124 B1 | * | 5/2004 | Koseki et al. | 707/202 |
| 6,738,875 B1 | * | 5/2004 | Wang | 711/159 |

OTHER PUBLICATIONS

Oracle Corporation, "Oracle 8i, Administrator's Guide," Release 2 (8.1.6), Dec. 1999, Part No. A76956-01, Chapter 16, 14 pages.

* cited by examiner

*Primary Examiner*—Sathyanarayan Pannala
(74) *Attorney, Agent, or Firm*—Christian A. Nicholes; Hickman Palermo Truong & Becker LLP

(57) ABSTRACT

A method and apparatus for the dynamic management of disk space by multiple database server instances in a cluster configuration is disclosed. A segment is partitioned. Each partition is associated with a bitmap block. A partition's bitmap block indicates the freeness of the partition's data blocks. A partition's bitmap block may be owned by one server instance at a time. After determining from a partition's bitmap block where free disk space is located within the partition, the partition's bitmap block's owner may allocate the free disk space for the owner's use. A bitmap block may become owned by different server instances at different times. When a server instance ceases to actively use its bitmap block, another server instance may "steal" the bitmap block. Thus, multiple server instances may allocate disk space in the same partition over time, preventing disk space waste.

28 Claims, 10 Drawing Sheets

600

602
CAUSE A FIRST-LEVEL BITMAP BLOCK, THAT IS ASSOCIATED WITH A SEGMENT PARTITION IN WHICH DISK SPACE HAS BEEN ALLOCATED FOR USE BY A SERVER INSTANCE, TO INDICATE A DIFFERENT AMOUNT OF FREE SPACE THAN THE AMOUNT OF FREE SPACE PREVIOUSLY INDICATED BY THE FIRST-LEVEL BITMAP BLOCK

604
CAUSE THE FIRST-LEVEL BITMAP BLOCK TO INDICATE THE MOST RECENT TIME AT WHICH DISK SPACE WAS ALLOCATED IN THE FIRST-LEVEL BITMAP BLOCK'S SEGMENT PARTITION FOR USE BY THE SERVER INSTANCE

606
UPDATE A SECOND-LEVEL BITMAP BLOCK, THAT IS ASSOCIATED WITH THE FIRST-LEVEL BITMAP BLOCK, TO INDICATE THE APPROXIMATE FREENESS OF THE FIRST-LEVEL BITMAP BLOCK

FIG. 6

DYNAMIC DISK SPACE MANAGEMENT BY MULTIPLE DATABASE SERVER INSTANCES IN A CLUSTER CONFIGURATION

CLAIM OF PRIORITY

This application claims benefit of Provisional Application Ser. No. 60/383,498, filed May 24, 2002, entitled "DYNAMIC DISK SPACE MANAGEMENT IN A CLUSTER CONFIGURATION," by Sujatha Muthulingam, Alexander Tsukerman, and Vishwanath Karra, the entire contents of which are incorporated by reference as if fully set forth herein.

FIELD OF THE INVENTION

The present invention relates to disk space management, and in particular, to the dynamic management of disk space by multiple database server instances in a cluster configuration.

BACKGROUND OF THE INVENTION

A database server allocates logical database space for data in a database. According to one approach, the units of database space allocation are data blocks, extents, and segments. At the finest level of granularity, a database server stores data in data blocks. One data block corresponds to a specific number of bytes of physical database space on disk. The next level of logical database space is an extent. An extent is a specific number of contiguous data blocks allocated for storing a specific type of information. The level of logical database storage above an extent is called a segment. A segment is a set of extents, each of which has been allocated for a specific data structure. For example, each database table's data is stored in the database table's own segment.

At any given moment, some of the data blocks in a segment may contain data, and some of the data blocks in the segment may be empty. Some data blocks may be partially, but not completely, full. The empty portions of data blocks within a segment comprise the free space of the segment. When a database server inserts data into a segment, the database server inserts the data into the segment's free space. The segment's free space is reduced accordingly.

According to one approach, a database server consults a segment's free space list to determine which data blocks in the segment are at least partially empty. The segment's free space list is a singly linked list. Pointers to the head and tail of the segment's free space list are stored in the segment's first block, which is called the segment header block. Thus, the segment header block may be viewed as containing metadata that describes where a segment's free space is located.

Multiple database server processes might attempt to insert data into the same segment simultaneously or almost simultaneously. When this occurs, each database server process contends for access to the segment's single segment header block. Because the segment header block contains the metadata described above, contention for the segment header block may be called "metadata contention." As a result of this metadata contention, the segment header block becomes a "hot spot." Compounding the problem, each database server process follows the same free space list links to data blocks in the segment's free space. As a result, the data blocks also may become hot spots. The contention for the segment header block and data blocks may significantly degrade throughput.

To alleviate contention at the data blocks, one approach implements multiple different free space lists per segment instead of a single free space list per a segment. While each of the free space lists similarly indicates all of the free space in the segment, each of the free space lists has a different head and tail. When a database server process attempts to insert data into a segment, the database server process' identifier is input into a hash function to produce a hash value. A particular free space list that corresponds to the hash value is selected from among the several free space lists. Thus, different database server processes are directed to different empty or partially empty data blocks in a balanced manner, thereby reducing contention at the data blocks. Unfortunately, because the different free space list heads and tails are contained in the same segment header block, contention at the segment header block remains.

To further complicate matters, a single database may be shared by multiple instances of a database server, such as in Oracle Corporation's Real Application Cluster ("RAC"). In such a configuration, each separate database server instance reads data from and writes data to the same disk space, but each database server instance maintains its own separate shared memory. A particular database server instance may comprise multiple database server processes, and each database server process of a particular database server instance may share the particular database server instance's shared memory. However, database server processes of one database server instance do not share the shared memory of another database server instance.

When a first database server instance needs to allocate disk space within a segment, the first database server instance first loads the segment's segment header block into a buffer cache in the first database server instance's shared memory. If a second database server instance needs to allocate disk space within the same segment, then the segment's segment header block first needs to be transferred from the buffer cache in the first database server instance's shared memory into a buffer cache in the second database server instance's shared memory. Such a transfer requires significant overhead, and may significantly degrade throughput, especially if the first and second database server instances execute on separate machines.

To avoid such transfers, one approach partitions each segment into multiple segment partitions; one for each database server instance. Each database server instance is associated with a different one of the segment partitions. Segment partitions are not shared between database server instances. Each segment partition is associated with its own separate free list group block. A free list group block contains metadata that indicates the location of the free disk space within the segment partition that is associated with the free list group block. Similar to a segment header block, a free list group block indicates a head and a tail of a linked list. Because only one database server instance accesses a particular free list group block, metadata contention between database server instances is reduced.

However, a significant drawback attends the approach just described. A first database server instance cannot allocate disk space within a second database server instance's segment partition. This is so even if the first database server instance's segment partition lacks sufficient free space and the second database server instance's segment partition contains abundant free space. The associations between database server instances and their segment partitions are static. It is difficult, if not impossible, to predetermine how large a particular database server instance's segment partition should be in relation to other segment partitions. Partition sharing is not permitted in the approach just described. As a result, significant amounts of disk space may be wasted.

These are some of the problems that attend past approaches to the management of disk space by multiple database server instances in a cluster configuration. Because of these problems, past approaches to the management of disk space by multiple database server instances in a cluster configuration leave much to be desired. Approaches that seek to reduce the waste of disk space do so at the cost of increased metadata contention. Approaches that seek to reduce metadata contention do so at the cost of wasted disk space. A disk space management technique that overcomes both of the problems of metadata contention and disk space waste is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A method and apparatus for the dynamic management of disk space by multiple database server instances in a cluster configuration is disclosed. According to one embodiment of the invention, a determination is made as to whether at least one bitmap block satisfies a first set of criteria. If at least one bitmap block satisfies the first set of criteria, then, based on information that is indicated in that bitmap block, disk space is allocated for use by a first server instance. Alternatively, if no bitmap block satisfies the first set of criteria, then a determination is made as to whether at least one bitmap block satisfies a second set of criteria. If at least one bitmap block satisfies the second set of criteria, then that bitmap block, which is associated with a second server instance, is associated with the first server instance instead, and, based on information that is indicated in that bitmap block, disk space is allocated for use by the first server instance.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a flow diagram that illustrates a technique, according to an embodiment of the present invention, for updating information in bitmap blocks.

DETAILED DESCRIPTION OF THE INVENTION

Figure 1:
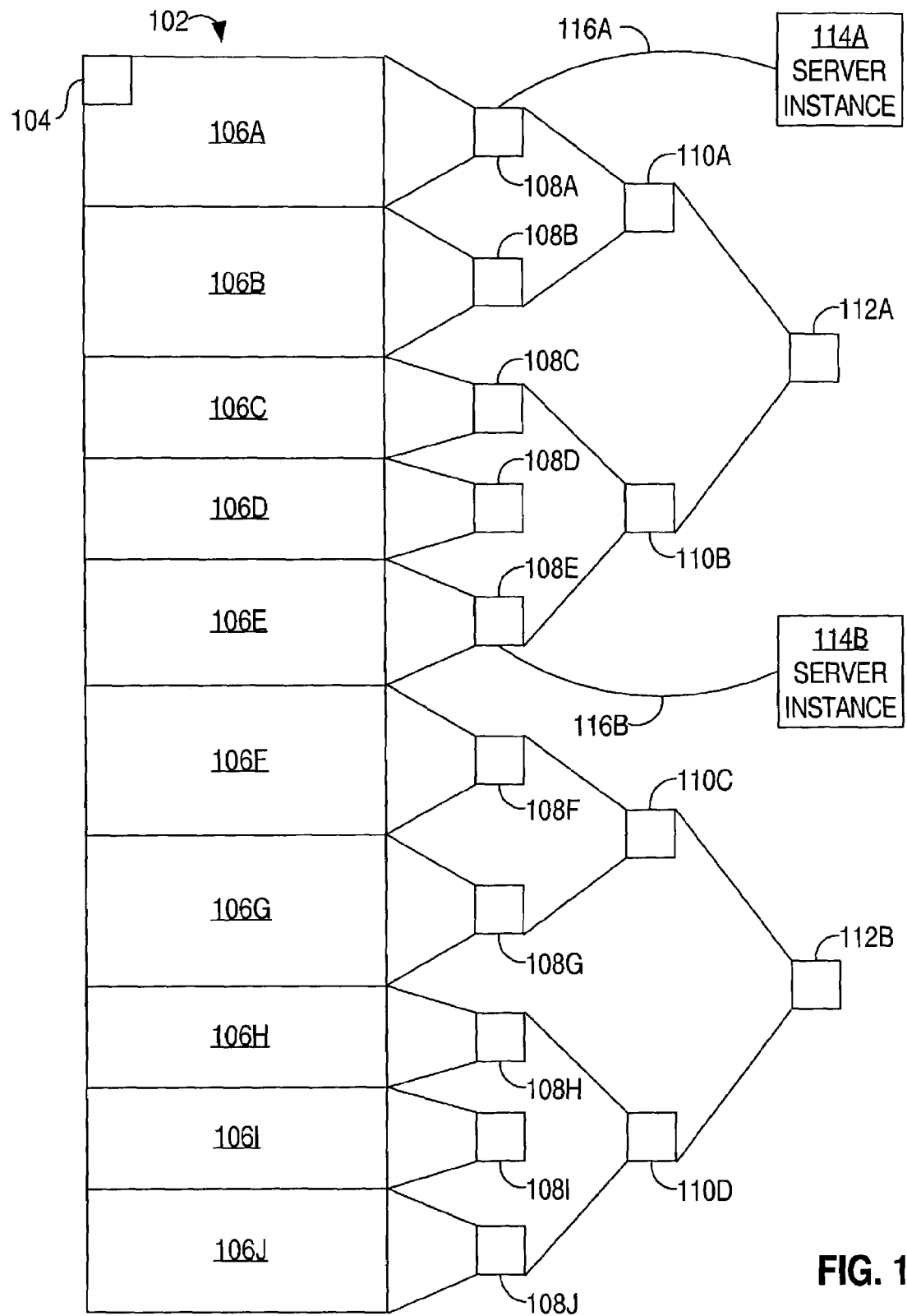
FIG. 1 is a block diagram that illustrates an example of a relationship between a segment and a hierarchy of bitmap blocks, according to an embodiment of the present invention.
Figure 2A:
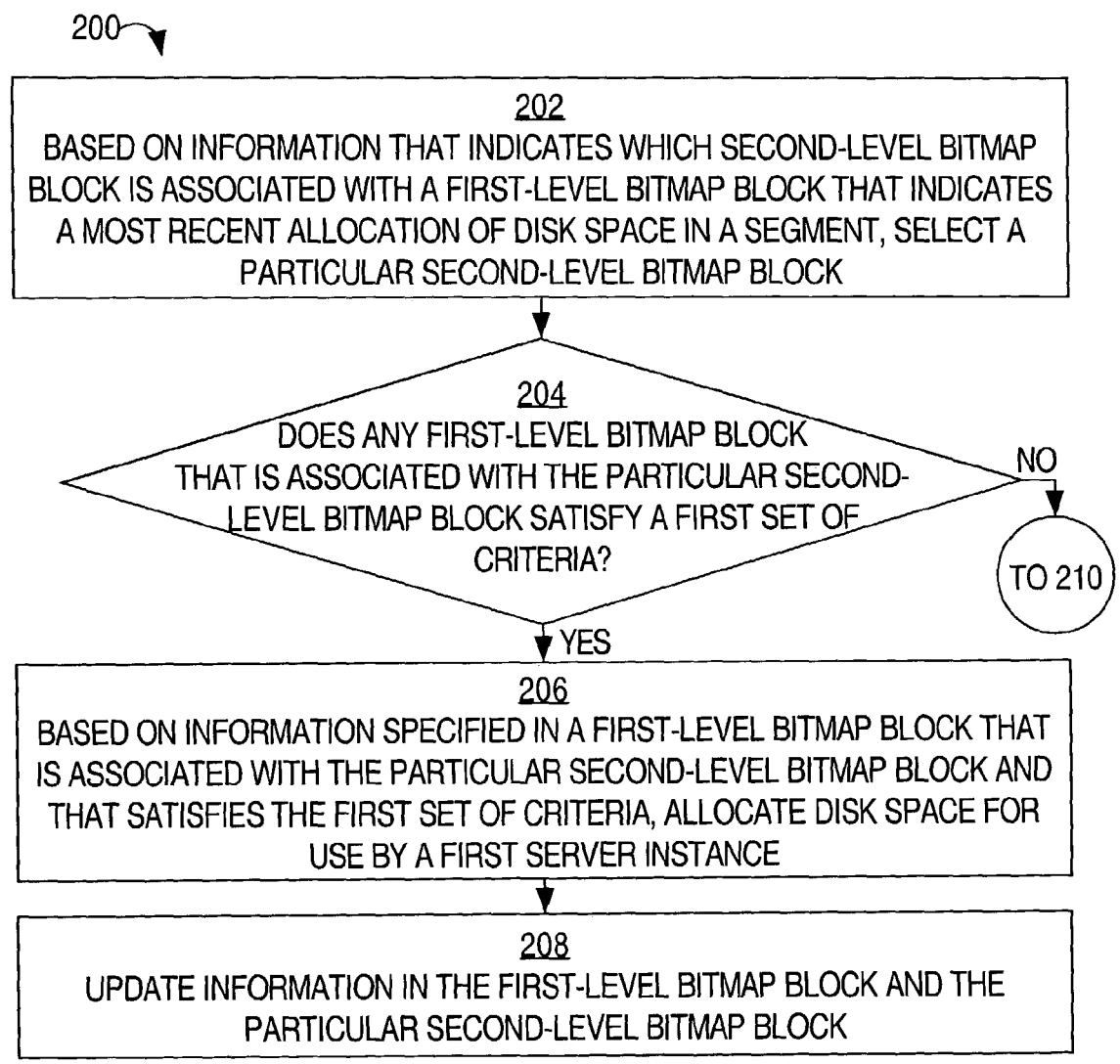
FIGS. 2A–2D are flow diagrams that illustrate a technique, according to an embodiment of the present invention, by which a database server instance in a cluster configuration may dynamically manage disk space.
Figure 2B:
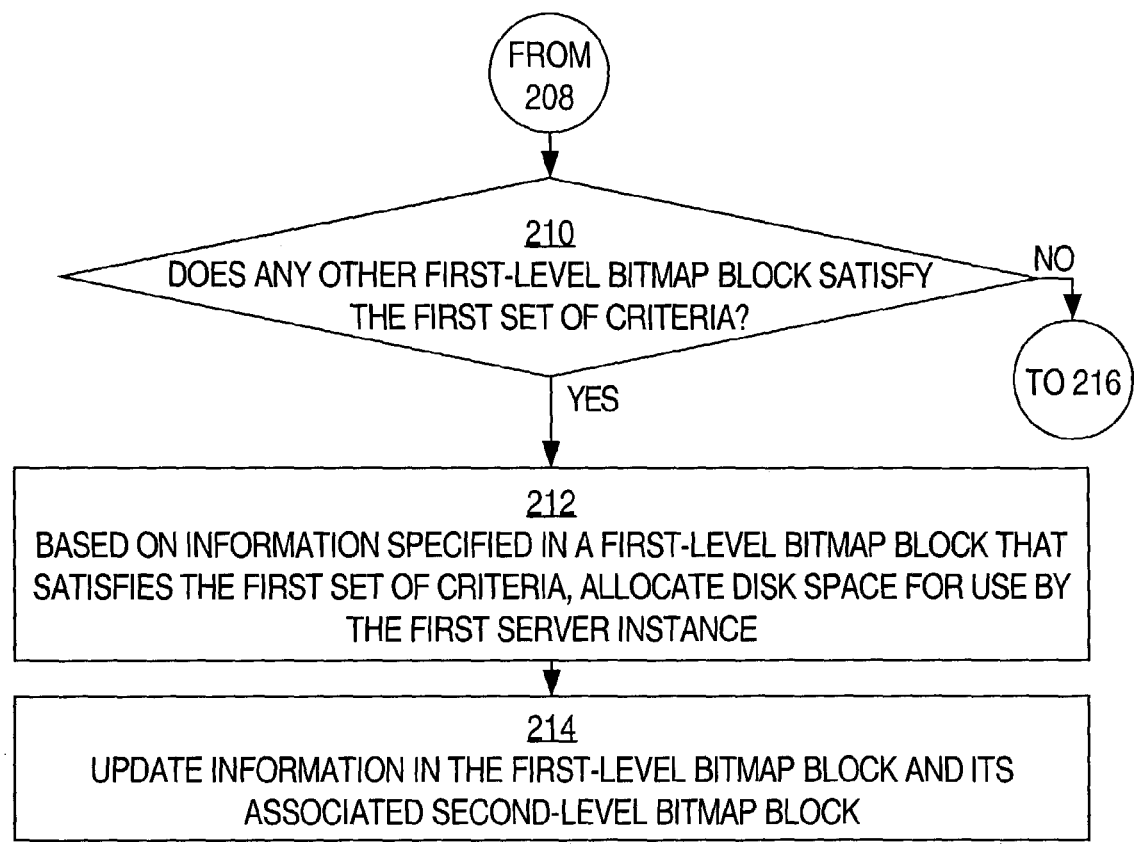
Figure 2C:
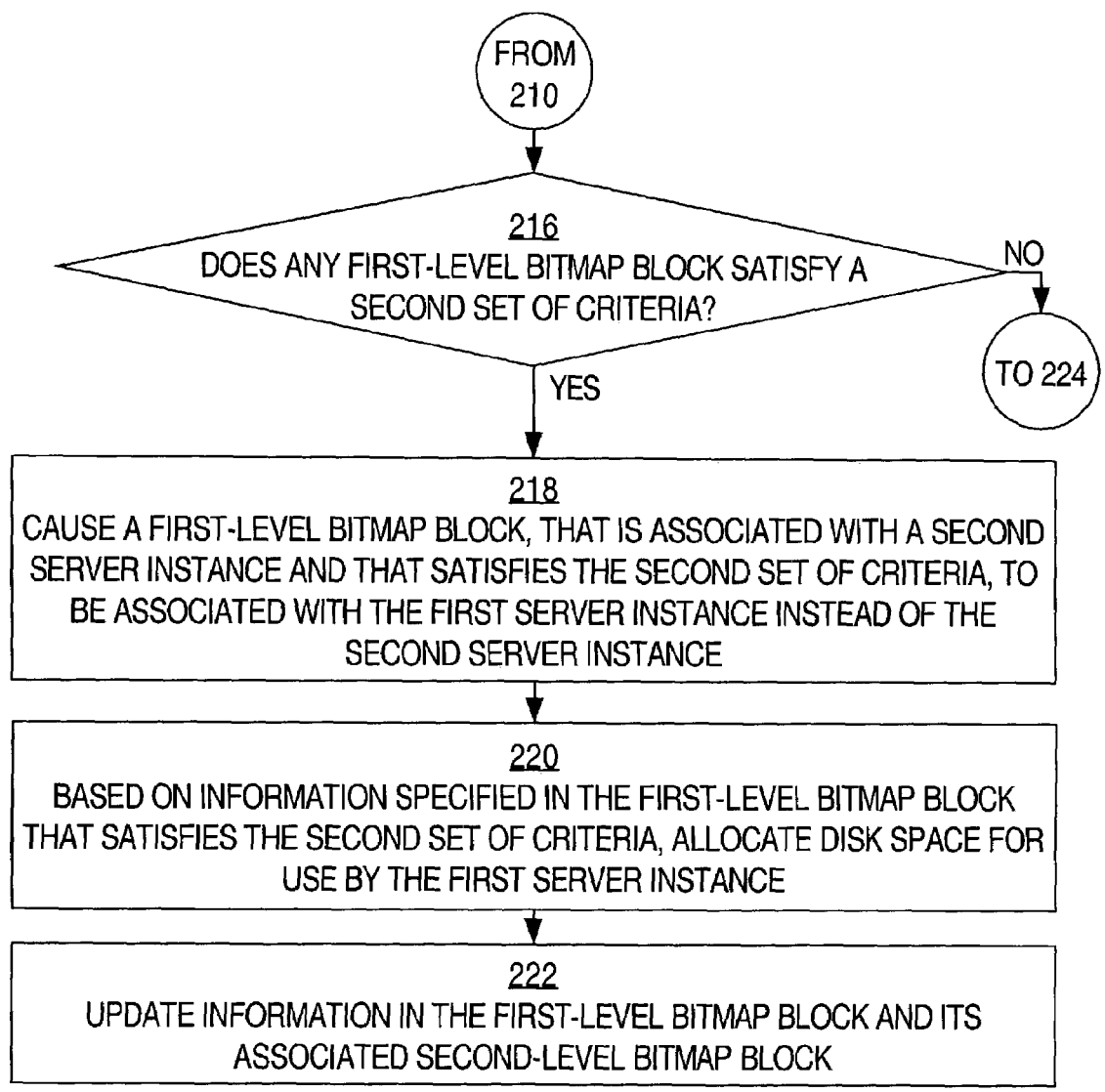
Figure 2D:
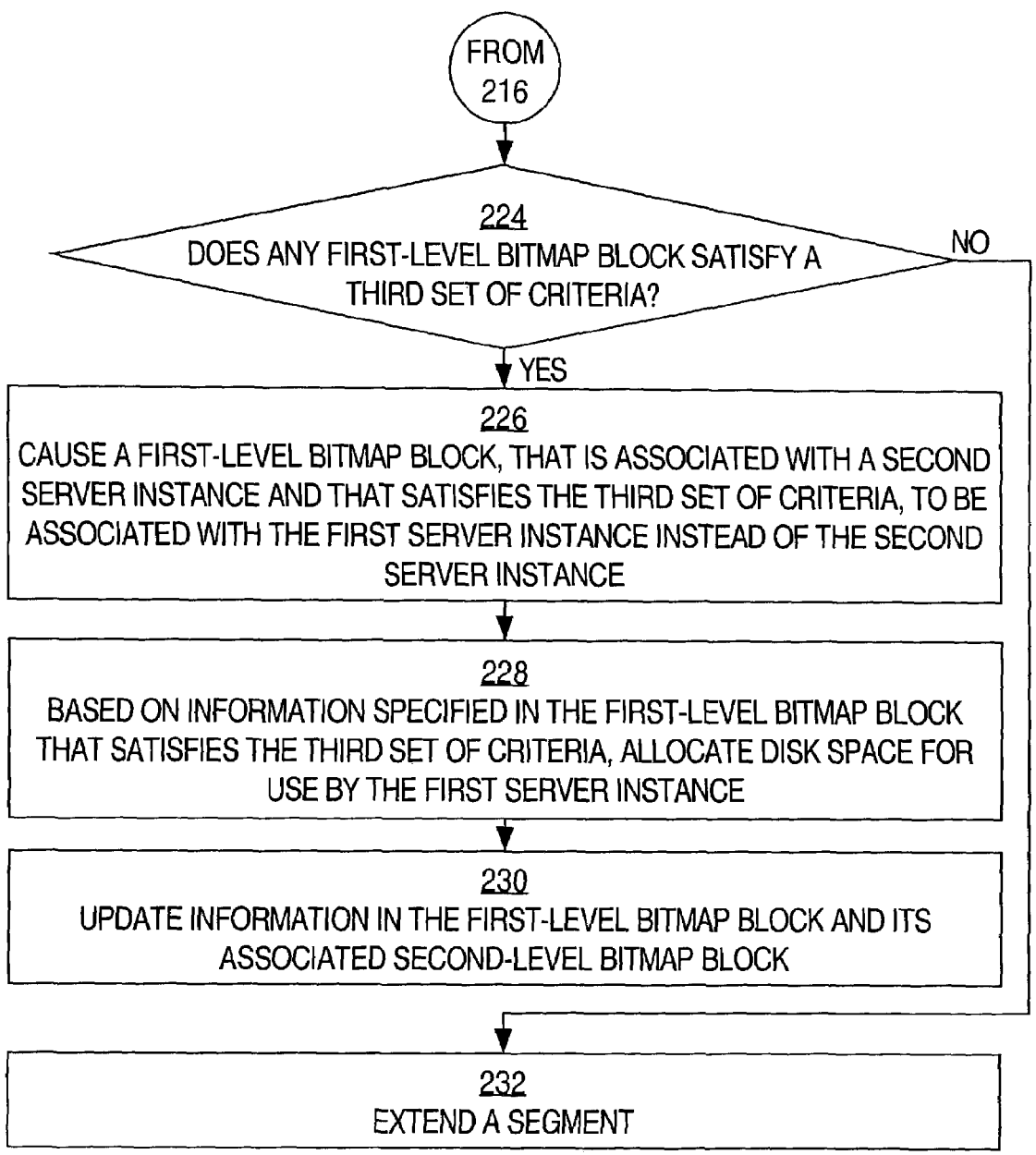

A method and apparatus for the dynamic management of disk space by multiple database server instances in a cluster configuration is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW

To reduce contention between database server instances, a segment is partitioned into multiple segment partitions. Each segment partition comprises a portion of the segment's data blocks. However, instead of linked lists, bitmap blocks are used to keep track of the location and extent of free disk space in the segment partitions. A bitmap block is a data block that contains a bitmap. As used herein, a bitmap is a set of bits that comprises, for each data block about which the bitmap stores information, a specified number of bits. Each segment partition is associated with its own bitmap block. A segment partition's bitmap block contains, for each data block in the segment partition, metadata that indicates the extent to which the data block is empty or used.

At any given time, a segment partition's bitmap block may be associated with no more than one of a plurality of database server instances. The database server instance with which a segment partition's bitmap block is associated may be said to "own" the segment partition's bitmap block. The database server instance that owns a segment partition's bitmap block may use the information indicated in the segment partition's bitmap block to determine how much and where free disk space is located within the segment partition. After determining how much and where free disk space is located within the segment partition, the database server instance may allocate the free disk space for use by the database server instance; for example, to write data to the free disk space. Because only one database server instance accesses a segment partition's bitmap block at a time, metadata contention between the database server instances is reduced. Consequently, throughput is improved.

Even though a segment partition's bitmap block is associated with only one database server instance at a time, the database server instance with which a segment partition's bitmap block is associated may change over time. For example, in one embodiment, when a segment partition's bitmap block ceases to be actively used by a database server instance that owns the segment partition's bitmap block, the segment partition's bitmap block may become owned by another database server instance instead. Because a segment partition's bitmap block may be owned by a first database server instance at a first time, and by a second database server instance at a second time, several different database server instances may allocate disk space in the same segment partition at different times. Thus, the associations between bitmap blocks and database server instances are dynamic.

As a result, a database server instance may allocate disk space in several different segment partitions, so that if one segment partition contains insufficient free space, a database server instance may allocate disk space in a different segment partition that contains sufficient free space. Free space is automatically balanced between segment partitions, without the intervention of a database administrator. Consequently, less disk space is wasted. This differs from prior approaches, in which a database server instance could not allocate disk space in more than a single segment partition, even if the segment partition was relatively full compared to other segment partitions.

Additionally, a multi-level hierarchy of bitmap blocks may be used to enable database server instances to quickly locate available segment partitions that contain adequate free space. The multi-level hierarchy may include a first level of bitmap blocks, each of which is associated with a different segment partition of a particular segment. The multi-level hierarchy may further include a second level of bitmap blocks. A first group of first-level bitmap blocks may be associated with a first second-level bitmap block, a second group of first-level bitmap blocks may be associated with a second second-level bitmap block, and so on. Each second-level bitmap block contains a summary of the first-level bitmap blocks in the group with which the second-level bitmap block is associated.

For example, a second-level bitmap block may indicate, for each first-level bitmap block in the second-level bitmap block's first-level bitmap block group, the proportion of free space in the first-level bitmap block's segment partition, and which database server instance owns the first-level bitmap block. Thus, by consulting a second-level bitmap block, a database server instance may determine the adequacy of first-level bitmap blocks for the database server instance's purposes more quickly than if the database server instance had to consult all of the first-level bitmap blocks.

Additionally, each segment may contain a hint that indicates which second-level bitmap block is associated with a first-level bitmap block that is associated with a segment partition in which disk space was most recently allocated within the segment. This hint may be contained in the segment's segment header block. By consulting the second-level bitmap block that is indicated by the hint, a database server instance may be more likely to find sufficient free space than if the database server instance consulted some other second-level bitmap block.

The multi-level hierarchy may further include a third level of bitmap blocks. A first group of second-level bitmap blocks may be associated with a first third-level bitmap block, a second group of second-level bitmap blocks may be associated with a second third-level bitmap block, and so on. Each third-level bitmap block contains addresses of the second-level bitmap blocks in the second-level bitmap block group with which the third-level bitmap block is associated. Third-level bitmap blocks are especially useful when there are many second-level bitmap blocks.

AN EXAMPLE BITMAP BLOCK HIERARCHY

FIG. 1 is a block diagram that illustrates an example of a relationship between a segment and a hierarchy of bitmap blocks, according to an embodiment of the present invention. A segment 102 is partitioned into segment partitions 106A–106J. Each of segment partitions 106A–106J comprises one or more data blocks within segment 102. Each of segment partitions 106A–106J is associated with a different one of first-level bitmap blocks 108A–108J. For example, segment partition 106A is associated with first-level bitmap block 108A, segment partition 106B is associated with first-level bitmap block 106B, and so on. Thus, first-level bitmap block 108A contains information about the freeness of the one or more data blocks in segment partition 106A, first-level bitmap block 108B contains information about the freeness of the one or more data blocks in segment partition 106B, and so on. According to one embodiment, each of first-level bitmap blocks 108A–108J contains information about the freeness of a specified number of data blocks; for example, 1024 data blocks.

For example, first-level bitmap block 108A may contain, for each data block in segment partition 106A, a separate set of bits. A set of bits for a first data block might indicate, for example, that the first data block is 25% free, while a set of bits for a second data block might indicate that the second data block is 75% free. The freeness of a data block may be approximated. For example, a set of bits may approximate the freeness of a data block to the nearest quartile. In this manner, fewer bits may be used to indicate the freeness of a data block.

Each of first-level bitmap blocks 108A–108J may be associated with a different server instance. For example, each server instance may be a different instance of a database server. Each of first-level bitmap blocks 108A–108J may contain information that indicates a server instance with which the first-level bitmap block is associated. For example, first-level bitmap block 108A indicates an association 116A with server instance 114A, and first-level bitmap block 108E indicates an association 116B with server instance 114B. Due to associations 116A and 116B, server instances 114A and 114B may be said to own first-level bitmap blocks 108A and 108E, respectively.

Each of first-level bitmap blocks 108A–108J also contains at least two timestamps. The first timestamp indicates a time at which the first-level bitmap block became owned by the server instance that currently owns the first-level bitmap block. The second timestamp indicates a time at which disk space was allocated most recently in the segment partition that corresponds to the first-level bitmap block. For example, first-level bitmap block 108A contains a first timestamp that indicates the time at which first-level bitmap block 108A became owned by server instance 114A, and a second timestamp that indicates the last time that any server instance allocated disk space in segment partition 106A. Based on the timestamps, a server instance may determine whether the ownership of the first-level bitmap block is "ripe" for changing. Through such changing, several different server instances may allocate disk space in the same first-level bitmap block's segment partition at different times.

First-level bitmap blocks 108A–108J are divided into groups. Each group of first-level bitmap blocks is associated with a different one of second-level bitmap blocks 110A–110D. Thus, first-level bitmap blocks 108A–108B are associated with second-level bitmap block 110A, first-level bitmap blocks 108C–108E are associated with second-level bitmap block 110B, and so on. Each second-level bitmap block contains information about the total data block freeness indicated by the one or more first-level bitmap blocks in the first-level bitmap block group that is associated with the second-level bitmap block. For example, second-level bitmap block 110A contains information about the total freeness of data blocks in segment partitions 106A and 106B, as indicated by first-level bitmap blocks 108A and 108B.

Each second-level bitmap block further contains information about which server instances own the first-level bitmap blocks in the first-level bitmap block group that is associated with the second-level bitmap block. For example, second-level bitmap block 110A indicates that first-level bitmap block 108A is owned by server instance 114A, and second-level bitmap block 110B indicates that first-level bitmap block 108E is owned by server instance 114B. When a first-level bitmap block's freeness or ownership information is modified, information in the first-level bitmap block's associated second-level bitmap block is updated to reflect the modification.

Therefore, by consulting second-level bitmap block 110A, for example, server instance 114A may determine the total freeness of data blocks in segment partition 106A, and that first-level bitmap block 108A is owned by server instance 114A. Thus, server instance 114A may determine the extent of free space in segment 102 more quickly than if server instance 114A had to inspect each of first-level bitmap blocks 108A–108J separately.

Segment 102 contains a segment header block 104. Segment header block 104 contains a hint that indicates which one of second-level bitmap blocks 110A–110D is associated with the one of first-level bitmap blocks 108A–108J that is associated with the one of segment partitions 106A–106J in which disk space was most recently allocated within segment 102. For example, if the disk space most recently allocated in segment 102 was allocated in segment partition 106D, then the hint would indicate second-level bitmap block 110B, because segment partition 106D is associated with first-level bitmap block 108D, and first-level bitmap block 108D is associated with second-level bitmap block 110B. By consulting the second-level bitmap block that is indicated by the hint, a server instance may be more likely to find sufficient free space than if the server instance consulted some other second-level bitmap block.

Second-level bitmap blocks 110A–110D are divided into groups. Each group of second-level bitmap blocks is associated with a different one of third-level bitmap blocks 112A–112B. Thus, second-level bitmap blocks 110A and 110B are associated with third-level bitmap block 112A, and second-level bitmap blocks 110C and 110D are associated with third-level bitmap block 112B. Each third-level bitmap block contains information about the addresses of the one or more second-level bitmap blocks in the second-level bitmap block group that is associated with the third-level data block. For example, third-level bitmap block 112A contains information about the addresses of second-level bitmap blocks 110A and 110B. The addresses may be represented as offsets from the beginning of segment 102, in which bitmap blocks 108A–108J, 110A–110D, and 112A–112B are stored. By referring to the third-level bitmap blocks, a server instance may quickly locate a particular second-level bitmap block.

DYNAMICALLY MANAGING DISK SPACE IN MULTIPLE SEGMENT PARTITIONS

FIGS. 2A–2D are block diagrams that illustrate a technique 200, according to an embodiment of the present invention, by which a database server instance in a cluster configuration may dynamically manage disk space. Technique 200 may be performed, for example, by server instance 114A when server instance 114A needs to insert data into a database table that corresponds to segment 102.

In block 202, a particular second-level bitmap block is selected from a group of second-level bitmap blocks. The particular second-level bitmap block is selected based on information that indicates which one of the second-level bitmap blocks is associated with a first-level bitmap block that indicates a most recent allocation of disk space in a segment.

For example, if disk space in segment 102 was allocated most recently in segment partition 106A, then the hint in segment header block 104 indicates second-level bitmap block 110A. This is because segment partition 106A is associated with first-level bitmap block 108A, which is associated with second-level bitmap block 110A. Therefore, based on the hint, server instance 104A selects second-level bitmap block 110A. Server instance 104A may determine the address of second-level bitmap block 110A from third-level bitmap block 112A.

In block 204, it is determined whether any first-level bitmap block that is associated with the particular second-level bitmap block satisfies a first set of criteria. For example, server instance 114A may determine whether any of first-level bitmap blocks 108A–108B satisfies the first set of criteria. An example of the first set of criteria is described below in the section entitled, "DETERMINING WHETHER A BITMAP BLOCK SATISFIES THE FIRST SET OF CRITERIA." If a first-level bitmap block that is associated with the particular second-level bitmap block satisfies the first set of criteria, then control passes to block 206. Otherwise, control passes to block 210.

In block 206, disk space is allocated, based on information specified in a first-level bitmap block that is associated with the particular second-level block and that satisfies the first set of criteria, for use by a first server instance. For example, if first-level bitmap block 108B satisfies the first set of criteria, then based on information that is indicated in first-level bitmap block 108B, server instance 114A may allocate disk space in data blocks in segment partition 106B for use by server instance 114A. As a result, the free space in segment partition 106B is reduced.

In block 208, information in the first-level bitmap block that is associated with the particular second-level block and that satisfies the first set of criteria is updated. Information in the second-level bitmap block that is associated with the first-level bitmap block is also updated. For example, based on the allocation of disk space in segment partition 106B, server instance 114A may update information contained in first-level bitmap block 108B and second-level bitmap block 110A. An example of a technique for updating information in bitmap blocks is described below in the section entitled, "UPDATING INFORMATION IN BITMAP BLOCKS."

In block 210, it is determined whether any other first-level bitmap block satisfies the first set of criteria. For example, server instance 114A may determine whether any of first-level bitmap blocks 108A–108J satisfies the first set of criteria. Server instance 114A may consult the information contained in second-level bitmap blocks 110A–110D to make this determination quickly. If at least one of the other first-level bitmap blocks satisfies the first set of criteria, then control passes to block 212. Otherwise, control passes to block 216.

In block 212, disk space is allocated, based on information specified in a first-level bitmap block that satisfies the first set of criteria, for use by a first server instance. For example, if first-level bitmap block 108J satisfies the first set of criteria, then based on information that is indicated in first-level bitmap block 108J, server instance 114A may allocate disk space in data blocks in segment partition 106J for use by server instance 114A. As a result, the free space in segment partition 106J is reduced.

In block 214, information in the first-level bitmap block that satisfies the first set of criteria is updated. Information in the second-level bitmap block that is associated with the first-level bitmap block is also updated. For example, based on the allocation of disk space in segment partition 106J, server instance 114A may update information contained in first-level bitmap block 108J and second-level bitmap block 110D.

In block 216, it is determined whether any first-level bitmap block satisfies a second set of criteria. For example, server instance 114A may determine whether any of first-level bitmap blocks 108A–108J satisfies the second set of criteria. An example of the second set of criteria is described below in the section entitled, "DETERMINING WHETHER A BITMAP BLOCK SATISFIES THE SECOND SET OF CRITERIA." Server instance 114A may consult the information contained in second-level bitmap blocks 110A–110D to make this determination quickly. If at least one of the first-level bitmap blocks satisfies the second set of criteria, then control passes to block 218. Otherwise, control passes to block 224.

In block 218, a first-level bitmap block that is associated with a second server instance and that satisfies the second set of criteria is caused to be associated with the first server instance instead of the second server instance. The first-level bitmap block is updated to indicate the time at which the first-level bitmap block became owned by the first server instance. For example, if first-level bitmap block 108E satisfies the second set of criteria, then server instance 114A may cause first-level bitmap block 108E to indicate that first-level bitmap block 108E is associated with server instance 114A instead of server instance 114B. Server instance 114A may be said to have "stolen" first-level bitmap block 108E thereby. Server instance 114A may also cause second-level bitmap block 110B to reflect the change in ownership.

In block 220, disk space is allocated, based on information specified in the first-level bitmap block that satisfies the second set of criteria, for use by the first server instance. For example, based on information that is indicated in first-level bitmap block 108E, server instance 114A may allocate disk space in data blocks in segment partition 106E for use by server instance 114A. As a result, the free space in segment partition 106E is reduced.

Thus, a database server instance may allocate disk space in several different segment partitions, so that if one segment partition contains insufficient free space, then the database server instance may allocate disk space in a different segment partition that contains sufficient free space. However, because no first-level bitmap block is owned by more than one server instance at a time, metadata contention is reduced.

In block 222, information in the first-level bitmap block that satisfies the second set of criteria is updated. Information in the second-level bitmap block that is associated with the first-level bitmap block is also updated. For example, based on the allocation of disk space in segment partition 106E, server instance 114E may update information contained in first-level bitmap block 108E and second-level bitmap block 110B.

In block 224, it is determined whether any first-level bitmap block satisfies a third set of criteria. For example, server instance 114A may determine whether any of first-level bitmap blocks 108A–108J satisfies the third set of criteria. An example of the third set of criteria is described below in the section entitled, "DETERMINING WHETHER A BITMAP BLOCK SATISFIES THE THIRD SET OF CRITERIA." Server instance 114A may consult the information contained in second-level bitmap blocks 110A–110D to make this determination quickly. If at least one of the first-level bitmap blocks satisfies the third set of criteria, then control passes to block 226. Otherwise, control passes to block 232.

In block 226, a first-level bitmap block that is associated with a second server instance and that satisfies the third set of criteria is caused to be associated with the first server instance instead of the second server instance. The first-level bitmap block is updated to indicate the time at which the first-level bitmap block became owned by the first server instance. For example, if first-level bitmap block 108E satisfies the third set of criteria, then server instance 114A may cause first-level bitmap block 108E to indicate that first-level bitmap block 108E is associated with server instance 114A instead of server instance 114B. Server instance 114A may also cause second-level bitmap block 110B to reflect the change in ownership.

In block 228, disk space is allocated, based on information specified in the first-level bitmap block that satisfies the third set of criteria, for use by the first server instance. For example, based on information that is indicated in first-level bitmap block 108E, server instance 114A may allocate disk space in data blocks in segment partition 106E for use by server instance 114A. As a result, the free space in segment partition 106E is reduced.

In block 230, information in the first-level bitmap block that satisfies the third set of criteria is updated. Information in the second-level bitmap block that is associated with the first-level bitmap block is also updated. For example, based on the allocation of disk space in segment partition 106E, server instance 114E may update information contained in first-level bitmap block 108E and second-level bitmap block 110B.

In block 232, a segment is expanded. For example, server instance 114A may allocate additional space on a persistent storage device so that the size of segment 202 is increased. A new partition may be created within the additional space and associated with a new first-level bitmap block. Disk space may be allocated in the new partition for use by the first server instance.

DETERMINING WHETHER A BITMAP BLOCK SATISFIES THE FIRST SET OF CRITERIA

Figure 3:
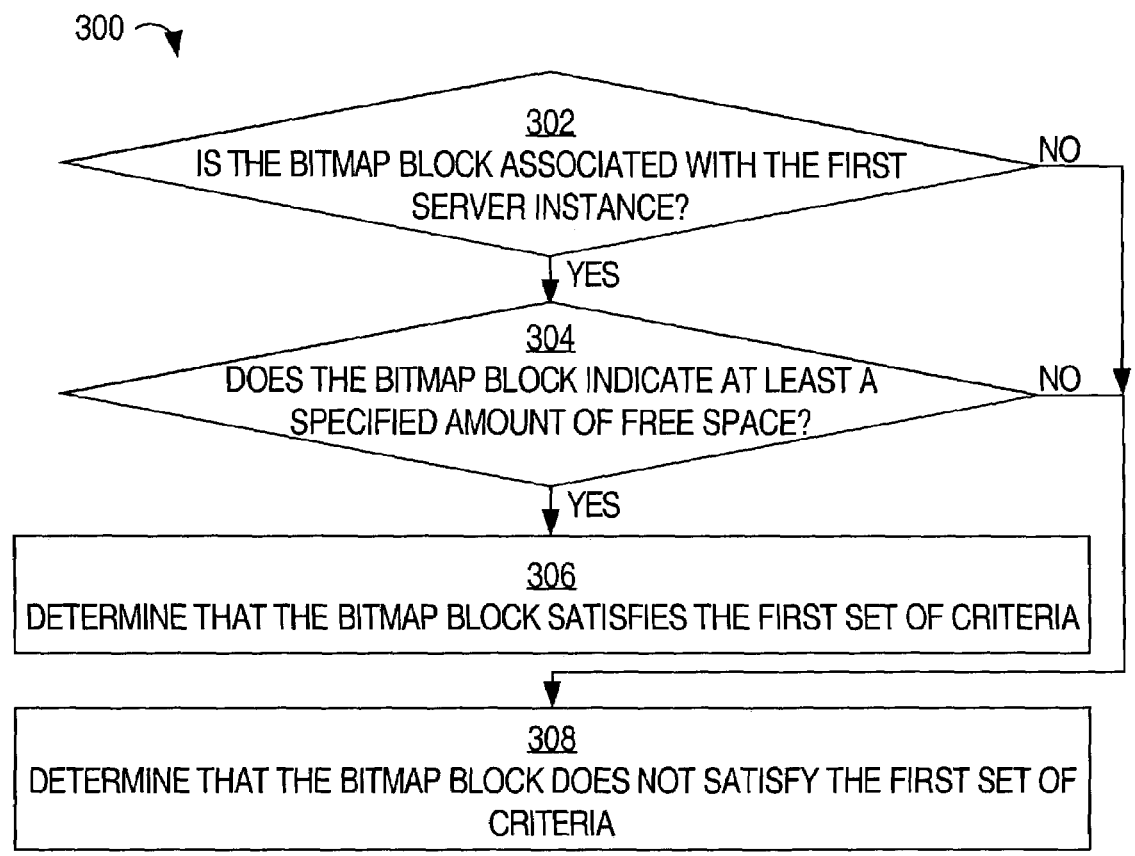
FIG. 3 is a flow diagram that illustrates a technique, according to an embodiment of the present invention, for determining whether a bitmap block satisfies a first set of criteria.

FIG. 3 is a block diagram that illustrates a technique 300, according to an embodiment of the present invention, for determining whether a bitmap block satisfies the first set of criteria. According to one embodiment, the first set of criteria includes a criterion that the bitmap block is associated with the first server instance (i.e., the first server instance described above with reference to technique 200), and also a criterion that the bitmap block indicates at least a specified amount of free disk space. Technique 300 may be performed, for example, by server instance 114A when server instance 114A performs the determination described above with reference to blocks 204 and 210.

In block 302, it is determined whether the bitmap block is associated with the first server instance. For example, server instance 114A may determine whether bitmap block 108A indicates that bitmap block 108A is owned by server instance 114A. If the bitmap block is associated with the first server instance, then control passes to block 304. Otherwise, control passes to block 308.

In block 304, it is determined whether the bitmap block indicates at least a specified amount of free disk space. For example, server instance 114A may determine, based on the size of the data blocks in segment partition 106A and the approximate freeness of those data blocks as indicated by bitmap block 108A, whether bitmap block 108A indicates at least an amount of space in segment partition 106A needed to store data, of a known size, that server instance 114A needs to insert into a database table that corresponds to segment 102. If the bitmap block indicates at least the specified amount of free disk space, then control passes to block 306. Otherwise, control passes to block 308.

In block 306, it is determined that the bitmap block satisfies the first set of criteria. Alternatively, in block 308, it is determined that the bitmap block does not satisfy the first set of criteria.

DETERMINING WHETHER A BITMAP BLOCK SATISFIES THE SECOND SET OF CRITERIA

Figure 4:
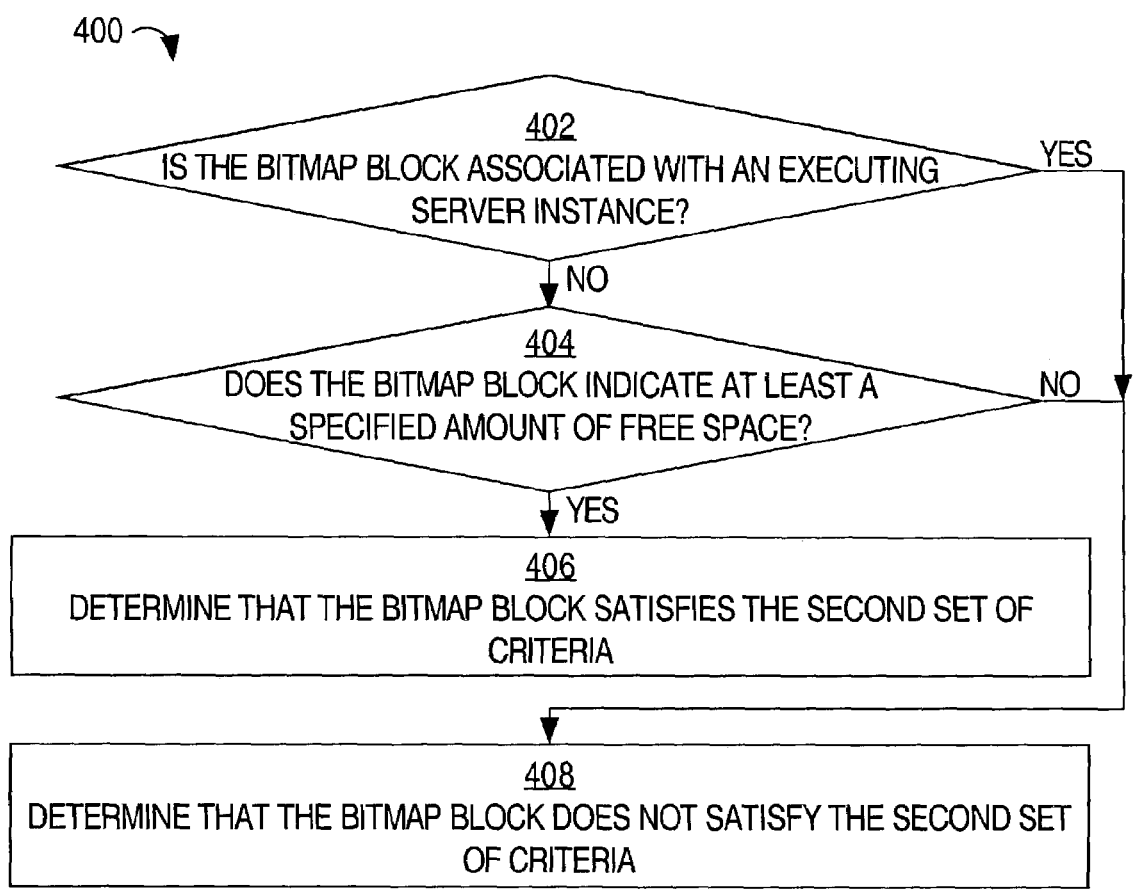
FIG. 4 is a flow diagram that illustrates a technique, according to an embodiment of the present invention, for determining whether a bitmap block satisfies a second set of criteria.

FIG. 4 is a block diagram that illustrates a technique 400, according to an embodiment of the present invention, for determining whether a bitmap block satisfies the first set of criteria. According to one embodiment, the second set of criteria includes a criterion that the bitmap block is not associated with an executing server instance, and also a criterion that the bitmap block indicates at least a specified amount of free disk space. Technique 400 may be performed, for example, by server instance 114A when server instance 114A performs the determination described above with reference to block 212.

In block 402, it is determined whether the bitmap block is associated with an executing server instance. An executing server instance may be called a "live" server instance, and a server instance that is no longer executing may be called a "dead" server instance. For example, server instance 114A may determine whether bitmap block 108B indicates that bitmap block 108B is owned by live server instance. If the bitmap block is owned by a dead server instance or no server instance at all, then control passes to block 404. If, on the other hand, the bitmap block is owned by a live server instance, then control passes to block 408.

In block 404, it is determined whether the bitmap block indicates at least a specified amount of free disk space. For example, server instance 114A may determine, based on the size of the data blocks in segment partition 106B and the approximate freeness of those data blocks as indicated by bitmap block 108B, whether bitmap block 108B indicates at least an amount of space in segment partition 106B needed to store data, of a known size, that server instance 114A needs to insert into a database table that corresponds to segment 102. If the bitmap block indicates at least the specified amount of free disk space, then control passes to block 406. Otherwise, control passes to block 408.

In block 406, it is determined that the bitmap block satisfies the second set of criteria. Alternatively, in block 408, it is determined that the bitmap block does not satisfy the second set of criteria.

DETERMINING WHETHER A BITMAP BLOCK SATISFIES THE THIRD SET OF CRITERIA

Figure 5:
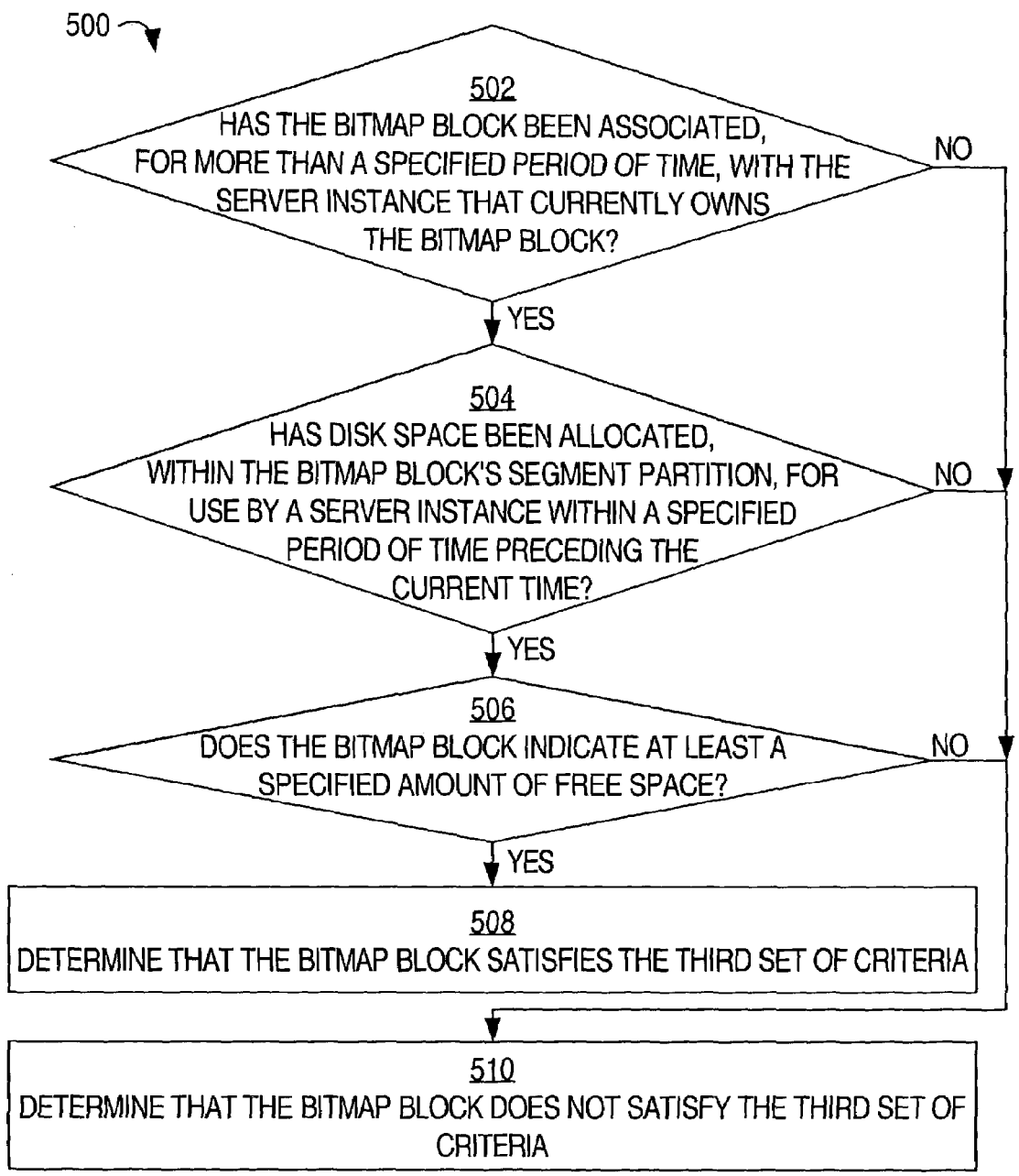
FIG. 5 is a flow diagram that illustrates a technique, according to an embodiment of the present invention, for determining whether a bitmap block satisfies a third set of criteria.

FIG. 5 is a block diagram that illustrates a technique 500, according to an embodiment of the present invention, for determining whether a bitmap block satisfies the third set of criteria. According to one embodiment, the third set of criteria includes a criterion that the bitmap block has been owned by the bitmap block's current owner for more than a first specified period of time, a criterion that the bitmap block indicates that disk space has been allocated in the bitmap block's segment partition within a second specified period of time preceding the current time, and also a criterion that the bitmap block indicates at least a specified amount of free disk space. Technique 500 may be performed, for example, by server instance 114A when server instance 114A performs the determination described above with reference to block 220.

In block 502, it is determined whether the bitmap block has been associated, for more than a specified period of time, with the server instance that currently owns the bitmap block. For example, server instance 114A may determine whether bitmap block 108E indicates that bitmap block 108E has been owned by server instance 114B for more than a specified period of time, such as 3 seconds. A server instance may make this determination by comparing the current time with a timestamp that indicates a time at which the bitmap block's current owner assumed ownership of the bitmap block. Requiring the satisfaction of this criterion ensures that a bitmap block will not be stolen from a server instance too soon, before the server instance has had a reasonable opportunity to use the bitmap block. If the server that currently owns the bitmap block has owned the bitmap block for more than the specified period of time, then control passes to block 504. Otherwise control passes to block 510.

In block 504, it is determined whether disk space has been allocated, within the bitmap block's segment partition, for use by a server instance within a specified period of time preceding the current time. For example, server instance 114A may determine whether bitmap block 108E indicates that disk space has been allocated, in segment partition 106E, for use by server instance 114B within a specified period of time, such as 2 seconds, before the current time. A server instance may make this determination by comparing the current time with a timestamp that indicates a time at which the bitmap block's current owner most recently allocated disk space, for use by the current owner, in the bitmap block's segment partition. Requiring the satisfaction of this criterion ensures that a bitmap block will not be stolen while a server instance is actively using the bitmap block. If the server that currently owns the bitmap block has not allocated disk space within the bitmap block's segment partition within the specified period of time preceding the current time, then control passes to block 506. Otherwise control passes to block 510.

In block 506, it is determined whether the bitmap block indicates at least a specified amount of free disk space. For example, server instance 114A may determine, based on the size of the data blocks in segment partition 106E and the approximate freeness of those data blocks as indicated by bitmap block 108E, whether bitmap block 108E indicates at least an amount of space in segment partition 106E needed to store data, of a known size, that server instance 114A needs to insert into a database table that corresponds to segment 102. If the bitmap block indicates at least the specified amount of free disk space, then control passes to block 508. Otherwise, control passes to block 510.

In block 508, it is determined that the bitmap block satisfies the third set of criteria. Alternatively, in block 510, it is determined that the bitmap block does not satisfy the third set of criteria.

UPDATING INFORMATION IN BITMAP BLOCKS

FIG. 6 is a block diagram that illustrates a technique 600, according to an embodiment of the present invention, for updating information in bitmap blocks. Technique 600 may be performed, for example, by server instance 114A when server instance 114A performs the updating described above with reference to blocks 208, 218, and 226.

In block 602, a first-level bitmap block that is associated with a segment partition in which disk space has been allocated for use by a server instance is caused to indicate a different amount of free space than the amount of free space previously indicated by the first-level bitmap block. For example, if server instance 114A has allocated disk space in segment partition 106A such that the segment partition 106A is now comprised of approximately 50% free space instead of approximately 75% free space, then server instance 114A updates first-level bitmap block 108A to indicate that segment partition 106A now comprises approximately 50% free space. Thus, other server instances may determine, from a segment partition's first-level bitmap block, the approximate freeness of the segment partition.

In block 604, the first-level bitmap block is caused to indicate the most recent time at which disk space was allocated in the first-level bitmap block's segment partition for use by the server instance. For example, server instance 114A may update first-level bitmap block 108A to indicate the most recent time at which server instance 114A allocated disk space in segment partition 106A for use by server instance 114A. Thus, other server instances may determine, from a segment partition's first-level bitmap block, whether the segment partition's first-level bitmap block's current owner is actively allocating disk space in the segment partition, and refrain from stealing the first-level bitmap block from the current owner if the current owner is actively allocating disk space in the segment partition.

In block 606, a second-level bitmap block that is associated with the first-level bitmap block is updated to indicate the approximate freeness of the first-level bitmap block. Thus, other server instances may determine, from a first-level bitmap block's second-level bitmap block, the approximate freeness of the first-level bitmap block's segment partition.

HARDWARE OVERVIEW

Figure 7:
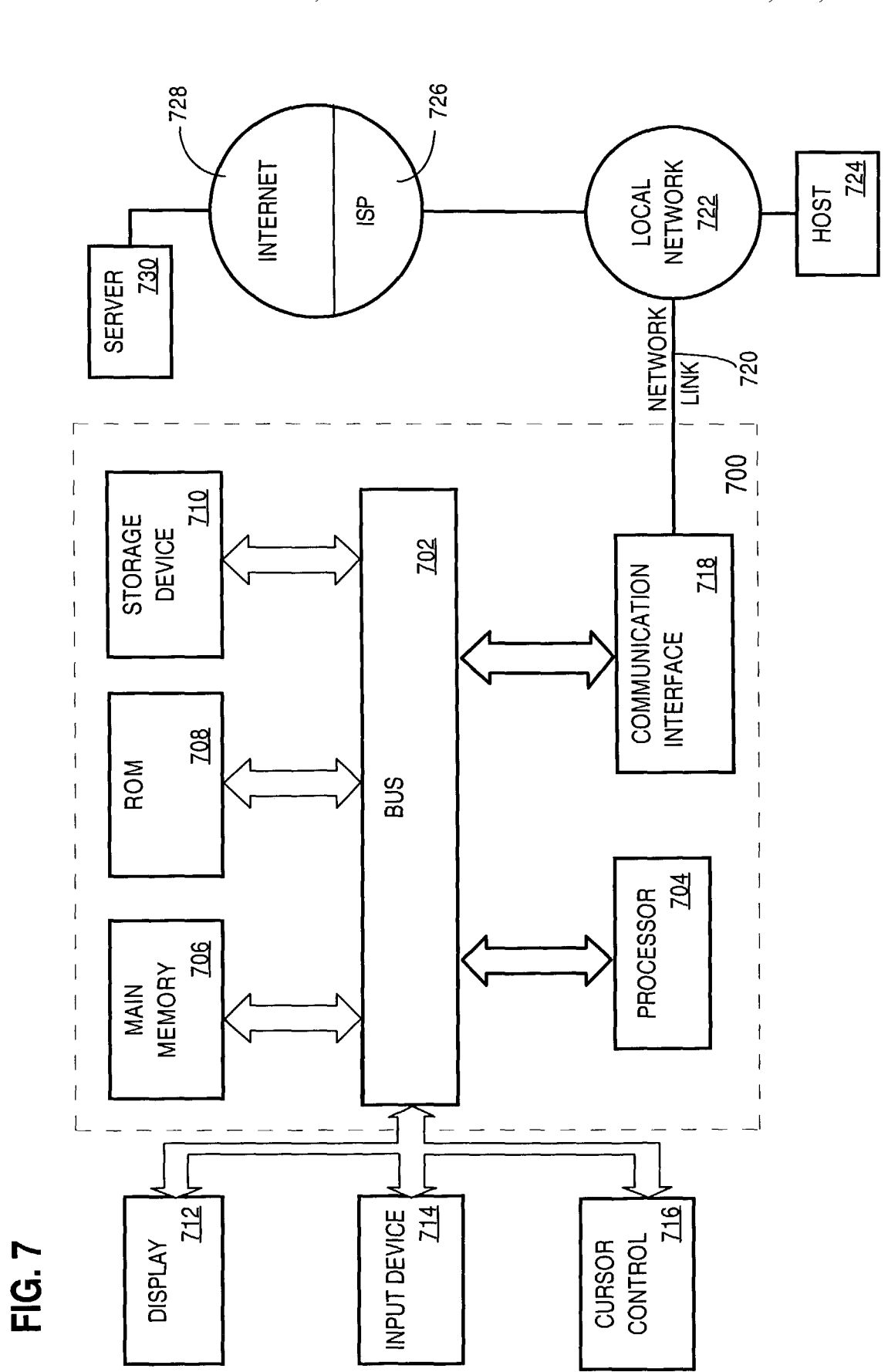
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing disk space, the method comprising:

associating a first set of one or more first-level bitmap blocks with a first second-level bitmap block;

associating a second set of one or more first-level bitmap blocks with a second second-level bitmap block;

selecting said first second-level bitmap block from a plurality of second-level bitmap blocks based on information that indicates which one of said plurality of second-level bitmap blocks is associated with a first-level bitmap block that indicates a most recent allocation of disk space for use by a server instance;

determining an address of said first second-level bitmap block based on information contained in a third-level bitmap block with which said second-level bitmap block is associated;

wherein no bitmap block in said first set of one or more first-level bitmap blocks is associated with said second second-level bitmap block;

wherein no bitmap block in said second set of one or more first-level bitmap blocks is associated with said first second-level bitmap block;

maintaining a plurality of resources that identify available disk space;

wherein each resource identifies a different set of available disk space than other resources in the plurality of resources;

wherein said plurality includes a first resource set that is associated with a first server instance;

determining whether at least one resource in the first resource set satisfies a first set of one or more criteria;

wherein determining whether at least one resource satisfies said first set of one or more criteria comprises determining, from information indicated in said first second-level bitmap block, whether at least one first-level bitmap block in said first set of one or more first-level bitmap blocks satisfies one or more particular criteria in said first set of one or more criteria;

if at least one resource in the first resource set satisfies said first set of one or more criteria, then, based on information that is indicated in said at least one resource in the first resource set, allocating disk space for use by the first server instance; and if no resource in the first resource set satisfies said first set of one or more criteria, then performing the steps of:

determining whether at least one resource in said plurality satisfies a second set of one or more criteria; and if at least one resource in said plurality satisfies said second set of one or more criteria, then performing the steps of:

causing a particular resource, that is in said plurality and that is associated with a second server instance and that satisfies said second set of one or more criteria, to be associated with said first server instance instead of said second server instance; and based on information that is indicated in said particular resource, allocating disk space for use by said first server instance.

2. A tangible computer-readable storage medium carrying one or more sequences of instructions which, when executed by one or more processors, causes the one or more processors to perform the method recited in claim 1.

3. A method comprising:

determining whether any bitmap block within a group of bitmap blocks both (a) is exclusively owned by a first server instance within a plurality of server instances and (b) indicates existence of at least a specified amount of free disk space in an associated segment partition;

if at least a first bitmap block within the group both (a) is exclusively owned by the first server instance and (b) indicates existence of at least the specified amount of free disk space in a first segment partition that is associated with the first bitmap block and no other bitmap block in the group, then allocating, in the first segment partition, disk space for use by the first server instance; and if no bitmap block within the group both (a) is exclusively owned by the first server instance and (b) indicates existence of at least the specified amount of free disk space in an associated segment partition, then performing secondary steps comprising:

determining whether any bitmap block within the group both (a) is not currently owned by any currently executing server instance within the plurality of server instances and (b) indicates existence of at least the specified amount of free disk space in an associated segment partition;

if at least a second bitmap block within the group both (a) is not currently owned by any currently executing server instance within the plurality of server instances and (b) indicates existence of at least the specified amount of free disk space in a second segment partition that is associated with the second bitmap block and no other bitmap block in the group, then (1) changing ownership of the second bitmap block to the first server instance and (2) allocating, in the second segment partition, disk space for use by the first server instance; and if no bitmap block within the group both (a) is not currently owned by any currently executing server instance within the plurality of server instances and (b) indicates existence of at least the specified amount of free disk space in an associated segment partition, then performing tertiary steps comprising:

determining whether any particular bitmap block within the group (a) has been owned by a current owner of that particular bitmap block for at least a first specified amount of time, (b) indicates that at least a second specified amount of time has passed since a most recent time that disk space was allocated in a segment partition that is associated with that particular bitmap block and no other bitmap block in the group, and (c) indicates existence of at least the specified amount of free disk space in the segment partition that is associated with that particular bitmap block;

if at least a third bitmap block within the group both (a) has been owned by a current owner of the third bitmap block for at least the first specified amount of time, (b) indicates that at least the second specified amount of time has passed since a most recent time that disk space was allocated in a third segment partition that is associated with the third bitmap block and no other bitmap block in the group, and (c) indicates existence of at least the specified amount of free disk space in the third segment partition, then (1) changing ownership of the third bitmap block from the current owner to the first server instance and (2) allocating, in the third segment partition, disk space for use by the first server instance.

4. A tangible computer-readable storage medium carrying one or more sequences of instructions which, when executed by one or more processors, causes the one or more processors to perform the method recited in claim 3.

5. A method comprising:
determining whether a first server instance, which currently exclusively owns a segment partition's bitmap block, has allocated one or more data blocks within the segment partition during a specified period of time; and
in response to determining that the first server instance has not allocated data blocks within the segment partition during the specified period of time, a second server instance (a) stealing the segment partition's bitmap block from the first server instance and (b) identifying available disk space in the segment partition based at least in part on information contained in the segment partition's bitmap block;
wherein, as a result of the second server instance stealing the segment partition's bitmap block from the first server instance, the segment partition's bitmap block becomes exclusively owned by the second server instance and ceases to be owned by the first server instance.

6. A tangible computer-readable storage medium carrying one or more sequences of instructions which, when executed by one or more processors, causes the one or more processors to perform the method recited in claim 5.

7. The method of claim 5, wherein said stealing is performed after determining that no bitmap block owned by the second server indicates at least a specified amount of free disk space.

8. The method of claim 5, wherein said stealing is performed after determining that the segment partition's bitmap block has been associated with said first server instance for more than a specified period of time.

9. The method of claim 5, wherein said stealing is performed after determining that the segment partition's bitmap block indicates at least a specified amount of free disk space.

10. The method of claim 5, wherein said stealing is performed after determining that said first server instance is no longer executing.

11. The method of claim 5, further comprising:
allocating, based on information that is indicated in the segment partition's bitmap block,
one or more data blocks for use by said second server instance.

12. The method of claim 11, wherein said allocating comprises updating the segment partition's bitmap block.

13. The method of claim 12, wherein said updating comprises causing the segment partition's bitmap block to indicate a time at which disk space was allocated for use by said second server instance.

14. The method of claim 12, wherein said updating comprises causing the segment partition's bitmap block to indicate a different amount of free space than an amount of free disk space previously indicated by the segment partition's bitmap block.

15. The method of claim 12, wherein said updating comprises updating information that is indicated in a second-level bitmap block that is associated with the segment partition's bitmap block.

16. The method of claim 5, wherein said stealing comprises updating the segment partition's bitmap block to indicate a time at which the segment partition's bitmap block became associated with said second server instance instead of said first server instance.

17. The method of claim 5, wherein said stealing comprises updating information that is indicated in a second-level bitmap block, with which the segment partition's bitmap block is associated, to indicate that said the segment partition's bitmap block is associated with said second server instance instead of said first server instance.

18. A tangible computer-readable storage medium carrying one or more sequences of instructions which, when executed by one or more processors, causes the one or more processors to perform the method recited in claim 7.

19. A tangible computer-readable storage medium carrying one or more sequences of instructions which, when executed by one or more processors, causes the one or more processors to perform the method recited in claim 8.

20. A tangible computer-readable storage medium carrying one or more sequences of instructions which, when executed by one or more processors, causes the one or more processors to perform the method recited in claim 9.

21. A tangible computer-readable storage medium carrying one or more sequences of instructions which, when executed by one or more processors, causes the one or more processors to perform the method recited in claim 10.

22. A tangible computer-readable storage medium carrying one or more sequences of instructions which, when executed by one or more processors, causes the one or more processors to perform the method recited in claim 11.

23. A tangible computer-readable storage medium carrying one or more sequences of instructions which, when executed by one or more processors, causes the one or more processors to perform the method recited in claim 12.

24. A tangible computer-readable storage medium carrying one or more sequences of instructions which, when executed by one or more processors, causes the one or more processors to perform the method recited in claim 13.

25. A tangible computer-readable storage medium carrying one or more sequences of instructions which, when executed by one or more processors, causes the one or more processors to perform the method recited in claim 14.

26. A tangible computer-readable storage medium carrying one or more sequences of instructions which, when executed by one or more processors, causes the one or more processors to perform the method recited in claim 15.

27. A tangible computer-readable storage medium carrying one or more sequences of instructions which, when executed by one or more processors, causes the one or more processors to perform the method recited in claim 16.

28. A tangible computer-readable storage medium carrying one or more sequences of instructions which, when executed by one or more processors, causes the one or more processors to perform the method recited in claim 17.

* * * * *